United States Patent
El-Jazairi

[11] Patent Number: 6,005,057
[45] Date of Patent: Dec. 21, 1999

[54] CEMENT GRINDING AID

[75] Inventor: Bayhass El-Jazairi, Sale, United Kingdom

[73] Assignee: MBT Holding AG, Zurich, Switzerland

[21] Appl. No.: 08/791,830

[22] Filed: Jan. 30, 1997

[30] Foreign Application Priority Data

Feb. 2, 1996 [GB] United Kingdom .................... 9602084

[51] Int. Cl.$^6$ ....................................................... C08F 8/14
[52] U.S. Cl. ......................... 525/327.7; 525/384; 106/693
[58] Field of Search ........................... 525/327.7; 106/693

[56] References Cited

U.S. PATENT DOCUMENTS

| | | | |
|---|---|---|---|
| 4,126,480 | 11/1978 | MacWilliams et al. | 106/100 |
| 4,136,830 | 1/1979 | Manfroy et al. | 241/16 |
| 5,369,198 | 11/1994 | Albrecht et al. | 526/240 |
| 5,478,391 | 12/1995 | Babaev et al. | 106/725 |

FOREIGN PATENT DOCUMENTS

| | | |
|---|---|---|
| 0 537 872 A1 | 4/1993 | European Pat. Off. . |
| 0 610 699 A1 | 8/1994 | European Pat. Off. . |
| 0 641 746 A2 | 3/1995 | European Pat. Off. . |

OTHER PUBLICATIONS

WPI/Derwent Abstract No. 84–117495.

*Primary Examiner*—Bernard Lipman
*Attorney, Agent, or Firm*—Fish & Richardson, P.C.

[57] ABSTRACT

A cement clinker grinding aid which comprises a styrene-maleic anhydride copolymer (SMA) superplasticiser. The SMA is preferably a type with polyoxyalkylene-based side chains. Use of the grinding aid renders the grinding process more efficient and improves the performance of cementitous compositions in which the cement thus ground is used.

4 Claims, No Drawings

CEMENT GRINDING AID

This invention relates to the grinding of cement clinker and more particularly to chemical admixtures which are used in this process.

The production of cement from the basic raw materials (calcium oxide source (typically limestone) and silica source (typically clay or silt)) is well known. The materials are blended and heated in a kiln. The cement emerges from the kiln in nodules known as clinker which must be ground to make cement the familiar powder form. This is generally done, for example, by ball-milling the clinker until a suitable size is reached. Grinding of cement may be enhanced by the use of grinding aids, substances which either reduce the energy of grinding or produce a better cement powder or both. Typical grinding aids include amines, particularly alkanolamines.

It has now been found not only that cement clinker can be ground much more efficiently by using particular substances, but also that the cement produced thereby has much enhanced properties. The invention therefore provides a cement clinker grinding aid which comprises a styrene-maleic anhydride copolymer superplasticiser.

The invention further provides a process of manufacturing a powdered cement by grinding clinker, there being added to the clinker prior to or during grinding a grinding aid which comprises styrene-maleic anhydride copolymer superplasticiser.

The invention further provides use of a styrene-maleic anhydride superplasticiser as a grinding aid for cement clinker.

A styrene-maleic anhydride copolymer (hereinafter "SMA") for use in this invention is one which is known to be useful as a superplasticiser in cementitious compositions. Such SMAs are well known to and used by the art for the improvement of flow in fluid cementitious compositions. It is a surprising feature of the invention that such an admixture can be used as a grinding aid for cement clinker.

Preferred SMAs for the purpose of this invention are styrene-maleic anhydride-derived copolymers in free acid or salt form and selected from the group consisting of those having the following types and numbers of monomer units:

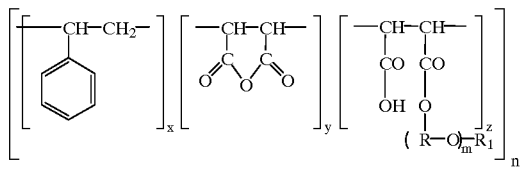

in which

R is an $C_{2-6}$ alkylene radical $R_1$ is an $C_{1-20}$ alkyl-, $C_{6-9}$ cycloalkyl- or phenyl group, x, y and z are numbers from 0.01 to 100 m is a number from 1 to 100 and n is a number from 10 to 100 with the provisos, that
  i) the ratio of x to (y+z) is from 1:10 to 10:1 inclusive,
  ii) the ratio of z:y is from 3:1 to 100:1 and
  iii) m+n=15–100;

and those having the following types and numbers of monomer units:

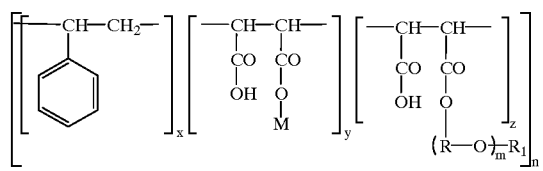

in which

M is hydrogen or the residue of a hydrophobic polyalkylene glycol or polysiloxane, $R_1$, m and n are as hereinabove defined x, y and z are numbers from 1 to 100 with the provisos that
  i) the ratio of x to (y+z) is from 1:10 to 10:1 inclusive,
  ii) the ratio of z:y is from 5:1 to 100:1, and
  iii) m+n=15–100.

These copolymers are described in U. S. Pat. No. 5,158,916 and French Published Application 2 671 090 the contents whereof are incorporated herein by reference.

The SMA is used either as a dry powder or as a solution or dispersion in a suitable liquid, water being preferred. The quantity added to cement clinker depends very much on the natures of the specific SMA and the specific cement, but as a general rule there is added from 0.05 to 1.0% SMA (solid by weight on cement clinker). Preferably there is added from 0.1 to 0.2%.

The SMA may be added to the clinker when it is in a ball mill and immediately prior to the commencement of grinding. It is possible and permissible to add further SMA during the course of grinding. Alternatively, it may be sprayed on the clinker during manufacture.

It is found that the addition of an appropriate proportion of SMA to a cement grinding mill results in a reduced level of returns to the mill (that is, more of the cement is ground in the initial process and does not require regrinding) and a lower energy consumption. Moreover, it is also found that the cement has usually better properties (better than a cement with the same quantity of the same SMA added at cementitous composition mixing stage).

The invention is further illustrated by the following non-limiting examples.

EXAMPLE 1

Cement Grinding in a Closed Circuit Mill

In a cement plant with closed circuit mill, the product from the mill is taken to a classifier which allows only ground material of an acceptable size to pass to storage, the oversize material being returned to the mill for further processing. The mill is equipped with a "Folafone" meter which measures the noise level in the mill, this being an indication of the efficiency of grind at a fixed feed rate - the higher the Folafone reading, the more efficient the grind.

Before the introduction of SMA polymer, the plant is run for 10 h without grinding aid; clinker/gypsum in the weight ratio of 52:1 is introduced to the closed circuit mill at a throughput rate of 30 tonnes/hr. A 60% by weight aqueous solution of an SMA polymer (example 1 from French Patent Application 2 671 090) is then sprayed on to the grinding mixture at a rate of 0.15% by weight dry SMA on cement and grinding is continued for 6 hours. Within half an hour of SMA addition, the residence time of the material in the mill is reduced. This is evidenced by an increase in the Folafone reading from 20 to 50% (at a fixed feed rate, the Folafone reading increase indicates that the loading in the grinding chamber is decreasing). This is caused by a reduction in returns from the classifier. The reduction in returns is about 20%, representing a substantial saving in energy (because more material is being ground more quickly). This would allow about 10–15% more throughput through the mill in comparison with the same mill without SMA addition.

EXAMPLE 2
Comparison of Cements

Two identical but representative cement samples from Example 1, one from the 10 hours grinding run (prior to addition of SMA) and the other from the 6 hours following the addition, are used. The two samples are subjected to the following tests:

i) workability increase and water reduction;
ii) suitability for use in mortar as per test method prEN934:Part3:"Admixtures for masonry mortar", and
iii) application properties of mortar i) Workability The material (cement, water, air-entraining admixture) are conditioned at 20° C. 1500 g cement is added to a small Hobart mixer bowl and 400 g water is then mixed in. Mixing is continued for 30 sec. and then stopped and the inside of the bowl scraped down. Mixing is then performed for a further 60 sec.

A cone is placed on a flow table apparatus which conforms to BS:4551 and is filled with the mixture, this being done in two layers with tamping 10 times for each layer. The cone is then removed with a twisting action to leave a cone of mixture. The table is then dropped 10 times in 6 seconds. The diameter of the cone is recorded (average of four readings). This entire procedure (mixing+ testing) is repeated twice, the first time with a constant water-cement (W/C) ratio and measuring workability increase, the second time maintaining a fixed workability and measuring water reduction. The result are shown in Tables 1 and 1.

TABLE 1

Constant water to cement ratio (W/C)

| Test Parameter | | Workability Increase |
|---|---|---|
| Cement | W/C | Workability |
| without SMA | 0.27 | 145 mm |
| with SMA | 0.27 | 170 mm |

TABLE 2

Constant workability (WR = water reduction)

| Test Parameter | | Water Reduction | |
|---|---|---|---|
| Cement | Workability | W/C | WR |
| without SMA | 145 mm | 0.27 | — |
| with SMA | 145 mm | 0.23 | 15% |

Is In a further test, the ability of the cement to certain air is measured according to test method prEN934:part 3. The air-entertaining admixture used is the commercial product "Febmix"(trade mark) Plus, used at a rate of 220 ml/50 kg cement. A control (containing no air-entertaining admixture) is also tested. The results are shown in Table 3.

TABLE 3

Air content

| Test Cement | Mix. | Water (ml) | Workability (mm) | Admix Dosage (ml) | Air Content (%) | | | WR (%) |
| | | | | | Initial | 15 mins mix. | 1 hour standing | |
|---|---|---|---|---|---|---|---|---|
| without SMA | Control | 680 | 43.2 | — | 12.0 | — | — | — |
| | Test Mix | 590 | 37.3 | 2.3 | 19.9 | 22.0 | 17.2 | 13 |
| with SMA | Control | 612 | 40.2 | — | 14.0 | — | — | — |
| | Test Mix | 540 | 37.5 | 2.3 | 21.0 | 24.0 | 18.2 | 12 |

The following observations may be made.
Table 1

The cement sample with SMA has a 17% increase workability compared to the sample which is manufactured with no SMA grinding aid.
Table 2

The example with SMA using the same cement gives a 15% water reduction when tested to a fixed workability.
Table 3

1 The control mix (without admixture and with SMA) requires 10% less water to achieve the specific workability than does the control which lacks both admixture and SMA.

2 Both control and test mixes for the SMA-containing cement gave higher air contents than did those for the non-SMA-containing manufactured cement.

It can be readily seen from these examples that SMA not only acts as a grinding aid, but also as a quality improver for the cement.

I claim:

1. A process of manufacturing a powdered cement by grinding clinker, there being added to the clinker prior to or during grinding a grinding aid which comprises styrene-maleic anhydride copolymer superplasticiser.

2. A process according to claim 1, wherein the styrene-maleic anhydride copolymer superplasticiser is selected from the group consisting of styrene-maleic anhydride-derived copolymers in free acid or salt form which have the following types and numbers of monomer units:

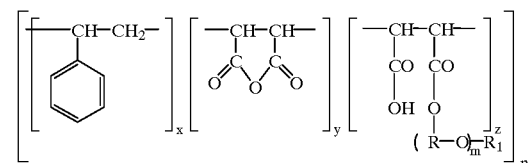

in which

R is an $C_{2-6}$ alkylene radical $R_1$ is an $C_{1-20}$ alkyl-, $C_{6-9}$ cycloalkyl- or phenyl group, x, y and z are numbers from 0.01 to 100 m is a number from 1 to 100 and n is a number from 10 to 100 with the provisos, that
  i) the ratio of x to (y+z) is from 1:10 to 10:1 inclusive,
  ii) the ratio of z:y is from 3:1 to 100:1 and
  iii) m+n=15–100;

and those having the following types and numbers of monomer units:

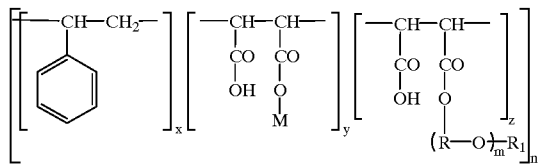

in which

M is hydrogen or the residue of a hydrophobic polyalkylene glycol of polysiloxane, $R_1$, m and n are as hereinabove defined x, y and z are numbers from 1 to 100 with the provisos that
  i) the ratio of x to (y+z) is from 1:10 to 10:1 inclusive,
  ii) the ratio of z:y is from 5:1 to 100:1, and
  iii) m+n=15–100.

3. A process according to claim 1, wherein there is added to the clinker from 0.05–1.0% by weight of solids based on the weight of the cement clinker of styrene-maleic anhydride copolymer superplasticiser.

4. A process according to claim 3, wherein the quantity is from 0.1–0.2% by weight of solids based on the weight of the cement clinker of styrene-maleic anhydride copolymer superplasticiser.

* * * * *